(12) United States Patent
Suzuki et al.

(10) Patent No.: US 8,666,581 B2
(45) Date of Patent: Mar. 4, 2014

(54) BICYCLE MOTOR CONTROL APPARATUS

(75) Inventors: Toshikuni Suzuki, Osaka (JP); Yoshio Umezawa, Osaka (JP); Bungo Sasaki, Osaka (JP)

(73) Assignee: Shimano Inc., Osaka (JP)

( * ) Notice: Subject to any disclaimer, the term of this patent is extended or adjusted under 35 U.S.C. 154(b) by 201 days.

(21) Appl. No.: 13/552,316

(22) Filed: Jul. 18, 2012

(65) Prior Publication Data

US 2013/0030629 A1    Jan. 31, 2013

(30) Foreign Application Priority Data

Jul. 27, 2011    (JP) ................... 2011-163880

(51) Int. Cl.
*B60L 9/00*    (2006.01)
*B62M 6/45*    (2010.01)

(52) U.S. Cl.
USPC ............................................. 701/22

(58) Field of Classification Search
USPC .............. 701/22; 180/206.1, 206.2, 206.3
See application file for complete search history.

(56) References Cited

U.S. PATENT DOCUMENTS

| | | | | |
|---|---|---|---|---|
| 5,375,676 A | * | 12/1994 | Takata et al. | 180/206.4 |
| 5,505,277 A | * | 4/1996 | Suganuma et al. | 180/206.3 |
| 5,749,429 A | * | 5/1998 | Yamauchi et al. | 180/206.4 |
| 5,836,414 A | * | 11/1998 | Seto et al. | 180/206.1 |
| 6,012,538 A | * | 1/2000 | Sonobe et al. | 180/220 |
| 6,125,959 A | * | 10/2000 | Seto et al. | 180/206.2 |
| 2005/0208845 A1 | * | 9/2005 | Jansen | 440/27 |

FOREIGN PATENT DOCUMENTS

JP    4-358987 A    12/1992
JP    2006-8062 A1    1/2006

* cited by examiner

*Primary Examiner* — John Q Nguyen
*Assistant Examiner* — Brian J Broadhead
(74) *Attorney, Agent, or Firm* — Global IP Counselors (57) ABSTRACT

A bicycle motor control apparatus includes a bicycle crank position detecting device, a bicycle crank position determining section, a stop determining section and a motor control section. The bicycle crank position detecting device detects a position of a bicycle crank. The bicycle crank position determining section determines if the bicycle crank is in a prescribed region including a bottom dead center position based on a detection result from the bicycle crank position detecting device. The stop determining section that determines a stopped state indicative of at least one a bicycle crank stopped state and a bicycle stopped state. The motor control section selectively outputs a motor driving command and stops the output of the motor driving command during a period in which the bicycle crank position determining section determines that the bicycle crank is in the prescribed region and the stop determining section determines that the stopped state exists.

14 Claims, 7 Drawing Sheets

BICYCLE MOTOR CONTROL APPARATUS

CROSS-REFERENCE TO RELATED APPLICATIONS

This application claims priority under 35 U.S.C. §119 to Japanese Patent Application No. 2011-163880, filed Jul. 27, 2011. The entire disclosure of Japanese Patent Application No. 2011-163880 is hereby incorporated herein by reference.

BACKGROUND

1. Field of the Invention

This invention generally relates to a motor control apparatus. More specifically, the present invention relates to a bicycle motor control apparatus that controls a motor installed on a bicycle. The invention also relates to a bicycle equipped with the motor control apparatus.

2. Background Information

In an electric powered bicycle that supplements a drive provided by the rider using a motor, a pedaling force is detected and the motor is controlled to deliver a supplemental drive force in accordance with the pedaling force. Among bicycle riding techniques, there is a particular bicycle mounting technique called the "cowboy mount" or "side mount" in which a rider places one foot on a pedal and kicks the ground with the other foot while holding the handlebar. When starting into motion using this particular mounting technique, there are times when a large pedaling force is detected and a supplemental force is delivered against the wishes of the user. In order to suppress the occurrence of such situations, a known technology is proposed that does not execute an assistance control until a prescribed amount of time has elapsed after the bicycle starts into motion (e.g., Japanese Laid-Open Patent Publication No. 4-358987).

There is also a known technology that uses a motor to electrically change gears of an external transmission. An example of this known technology is disclosed in Japanese Laid-Open Patent Publication No. 2006-008062. The external transmission cannot change gears unless the bicycle crank rotates. Thus, the conventional technology detects if the bicycle crank is rotating and executes a gear change control such that the motor does not operate when the bicycle crank is not rotating.

SUMMARY

With the technology presented in Japanese Laid-Open Patent Publication No. 4-358987, an assisting force is not delivered until a prescribed amount of time has elapsed since the bicycle started moving. Thus, even if for example, a rider starts the bicycle into motion while sitting on the saddle, an assisting force cannot be obtained until the prescribed amount of time has elapsed. Consequently, when, for example, a rider starts the bicycle into motion on an uphill slope while seated on the saddle, the control is inconvenient to the rider because an assisting force cannot be obtained for a prescribed amount of time.

With the technology presented in Japanese Laid-Open Patent Publication No. 2006-008062, since the gear change control can be executed when the bicycle crank rotates, there is a possibility that a slight rotation of the bicycle crank occurring when a rider starts the bicycle into motion using the particular mounting technique will cause an inappropriate gear change operation to occur while the bicycle is in a state in which changing gears cannot actually be accomplished.

One object presented in the present disclosure is to enable a motor to be controlled appropriately in accordance with a riding technique used when starting the bicycle into motion.

In view of the state of the known technology, a bicycle motor control apparatus according to a first aspect is provided that basically comprises a bicycle crank position detecting device, a bicycle crank position determining section, a stop determining section and a motor control section. The bicycle crank position detecting device detects a position of a bicycle crank. The bicycle crank position determining section determines if the bicycle crank is in a prescribed region including a bottom dead center position based on a detection result from the bicycle crank position detecting device. The stop determining section that determines a stopped state indicative of at least one a bicycle crank stopped state and a bicycle stopped state. The motor control section selectively outputs a motor driving command and stops the output of the motor driving command during a period in which the bicycle crank position determining section determines that the bicycle crank is in the prescribed region and the stop determining section determines that the stopped state exists.

With this bicycle motor control apparatus, driving of the motor is prohibited when it is determined that the bicycle or the bicycle crank is stopped and the bicycle crank position is in a prescribed region including a bottom dead center position. Thus, while the bicycle crank is positioned within the prescribed region, the motor will not be driven even if a rider uses a particular mounting technique in which the rider places one foot on a pedal and kicks the ground with the other foot when starting the bicycle into motion. As a result, in a bicycle in which the motor supplements a drive provided by the rider, it is possible to suppress an occurrence of an undesired supplemental force increase that accompanies a pedaling force increase occurring due to the prescribed mounting technique. Also, when the bicycle is started into motion by sitting on the saddle and turning the bicycle crank, control can be executed to deliver an appropriate assisting force once the bicycle crank exits the prescribed region and the amount of time elapsed after the bicycle starts moving is irrelevant. Furthermore, the occurrence of situations in which an assisting force is not delivered even though the bicycle crank position is such that an assisting force from the motor is necessary can be suppressed. Meanwhile, in a bicycle in which the motor drives an external transmission, an inappropriate gear change operation does not occur even if the bicycle crank turns while the bicycle crank is within the prescribed region. As a result, a motor can be controlled appropriately in accordance with a riding technique used when starting the bicycle into motion.

A bicycle motor control apparatus according to a second aspect is a bicycle motor control apparatus according to the first aspect, wherein the bicycle crank position detecting device has a magnet and a magnetic force detecting element. The magnet can be attached to one of the bicycle crank of the bicycle and a frame of the bicycle and has an S-pole part and an N-pole part arranged to be spaced apart from each other along a circumferential direction. Two of the magnetic force detecting elements are attached to the other of the bicycle crank of the bicycle and the frame of the bicycle and arranged facing the magnet in positions corresponding to the prescribed region.

Thus, it is possible to detect if the bicycle crank is within the prescribed region based on a magnetic force in a non-contact manner without being affected by dirt or other contaminants. As a result, the bicycle crank position can be detected with good accuracy even if the bicycle crank position detecting device is installed on a bicycle that is ridden outdoors where it can easily become dirty. Also, the bicycle crank position can be detected with a simple mechanism.

A bicycle motor control apparatus according to a third aspect is the bicycle motor control apparatus according to the second aspect, wherein the bicycle crank position determining section determines if the bicycle crank is in the prescribed region based on outputs from the magnetic force detecting elements. With this aspect, a determination as to whether or not the bicycle crank position is within the prescribed region can be accomplished easily using a combination of outputs from two magnetic force detecting elements arranged corresponding to the prescribed region. Specifically, some people perform the particular mounting technique starting from the left side of the bicycle (viewed from the rear) and others perform the technique from the right side. Thus, there are two bottom dead center positions 180 degrees apart from each other, i.e., one for the left crank and one for the right crank. However, using a combination of outputs from two magnetic force detecting elements, a determination can easily be accomplished with respect to a prescribed region including two bottom dead center positions that are 180 degrees apart.

A bicycle motor control apparatus according to a fourth aspect is the bicycle motor control apparatus according to the second or third aspect, wherein the stop determining section determines that the bicycle crank is stopped when the outputs from the magnetic force detecting elements do not change for a predetermined amount of time. With this aspect, the structure of the motor control apparatus can be simplified because determining if the bicycle crank is stopped can be accomplished based on the outputs of the magnetic force detecting elements of the bicycle crank position detecting device and, thus, it is not necessary to provide a separate detecting section.

A bicycle motor control apparatus according to a fifth aspect is a bicycle motor control apparatus according to the first aspect, wherein the stop determining section has a speed detecting section that detects a speed of the bicycle. With this aspect, a determination as to whether the bicycle is stopped can be accomplished easily based on a speed. It is also possible to detect if the bicycle is starting into motion based on a change of the speed.

A bicycle motor control apparatus according to a sixth aspect is a bicycle motor control apparatus according to any one of the first to fifth aspects, further comprising a pedaling force detecting section that detects a pedaling force acting on the bicycle.

The motor can be installed on the bicycle such that it supplements a drive provided by the rider. The motor control section drives the motor according to the pedaling force if the bicycle crank position determining section determines that the bicycle crank has exited from the prescribed region when driving the motor is prohibited. In other words, if the crank position determining section determines that the crank has departed from the prescribed region during a period when driving the motor is prohibited, then the motor control section drives the motor according to the pedaling force.

With this aspect, the motor is not driven when the bicycle crank is positioned within the prescribed region, even if a rider performs the particular mounting technique. As a result, when the motor supplements a drive provided by the rider, it is possible to suppress an occurrence of an unexpected speed increase caused by a pedaling force increase. Also, when the bicycle is started into motion by sitting on the saddle and turning the bicycle crank, control can be executed to deliver an appropriate assisting force once the bicycle crank exits the prescribed region regardless of the amount of time elapsed since the bicycle started moving. As a result, a motor can be controlled appropriately in accordance with a riding technique used when starting the bicycle into motion and the occurrence of situations in which an assisting force is not delivered even though the bicycle crank position is such that an assisting force from the motor is necessary can be suppressed.

A bicycle motor control apparatus according to a seventh aspect is a bicycle motor control apparatus according to any one of the first to fifth aspects, wherein the motor is a motor that drives an external transmission. With this aspect, in a bicycle in which the motor drives an external transmission, an inappropriate gear change operation will not occur even if the bicycle crank turns while the bicycle crank is within the prescribed region. As a result, a motor for driving an external transmission can be controlled appropriately in accordance with a riding technique used when starting the bicycle into motion.

A bicycle according to an eighth aspect is equipped with a motor and a bicycle motor control apparatus according to any one of the first to seventh aspects. With this aspect, the operational effects explained above can be obtained in a bicycle.

Driving a motor is prohibited when a crank position is determined to be in a prescribed region including bottom dead center. Thus, while the bicycle crank is positioned within the prescribed region, the motor will not be driven even if a rider uses a particular mounting technique in which the rider places one foot on a pedal and kicks the ground with the other foot. As a result, an assisting motor can be controlled appropriately in accordance with a riding technique used when starting the bicycle into motion.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
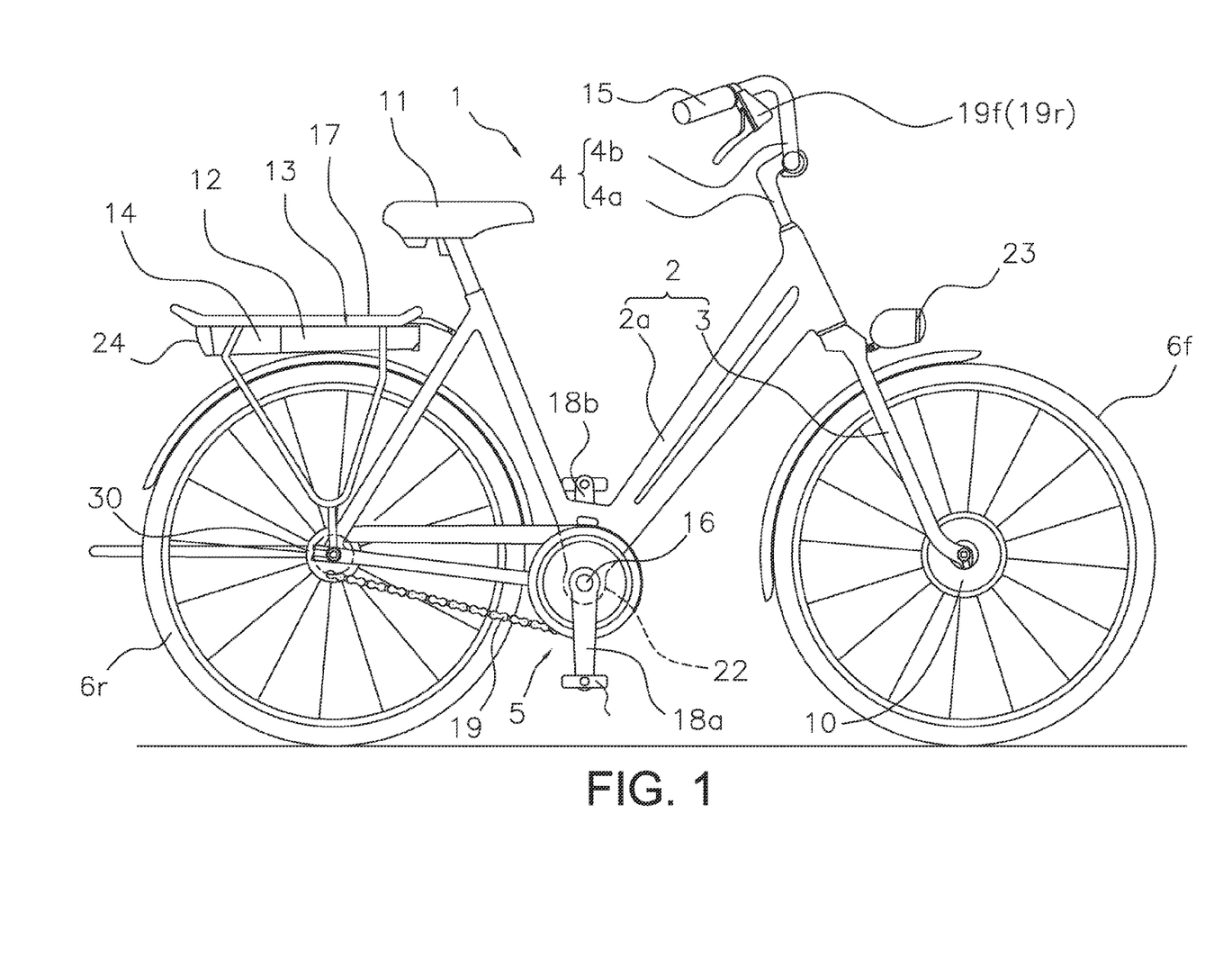
FIG. 1 is a side elevational view of a bicycle that is equipped with a bicycle motor control apparatus in accordance with a first embodiment.

Referring initially to FIG. 1, a bicycle 1 is illustrated with a bicycle motor control apparatus in accordance with a first embodiment. The bicycle is an electric powered bicycle configured to assist a rider by using a motor unit 10 to supplement a drive force (e.g., a pedaling force) imparted by the rider. The bicycle 1 includes a frame 2 having a frame body 2a and a front fork 3. As shown in FIG. 1, the front fork 3 is attached to a frontward portion of the frame body 2a such that it can pivot about a slanted axis. The bicycle 1 further includes a handlebar unit 4 attached to the upper end of the front fork 3 for steering the bicycle 1. The bicycle 1 further includes a drive train 5, a front wheel 6f, a rear wheel 6r, an electrical system 7 (see FIG. 2), a saddle 11, a headlamp 23 and a tail lamp 24. The drive train 5 includes a crank axle 16, a right crank 18a, a left crank 18b, a chain 19 and an internally geared hub 30. The bicycle 1 includes other conventional components such as a front brake device, a rear brake device, etc., which are not shown in FIG. 1.

The saddle 11, the handlebar unit 4, and other components are attached to the frame body 2a. The frame body 2a has a hanger tube 22 for supporting the crank axle 16. The hanger tube 22 is provided on a bottom middle portion of the frame body 2a. A hanger unit 22a is disposed on the right crank 18a and the hanger tube 22 as explained later.

The drive crank axle 16 is rotatably supported in the hanger tube 22 of the frame body 2a. The right and left cranks 18a and 18b are fixed to opposite ends of the crank axle 16. Pedals 21 are attached to tip ends of the right and left cranks 18a and 18b, The right and left cranks 18a and 18b are 180 degrees out of phase. The chain 19 is arranged across a front gear provided on the right crank 18a. The internally geared hub 30 is driven by the chain 19. The internally geared hub 30 is arranged at a center of the rear wheel 6r. The internally geared hub is provided with, for example, eight or eleven gears. A rear brake device comprising, for example, a roller brake, a band brake, or a disk brake is connected to the internally geared hub 30. The internally geared hub 30 is connected with a shifter cable to a gear shifter section (not shown) installed on the handlebar unit 4.

A rear carrier 17 is attached to an upper rearward portion of the frame body 2a. A rear carrier unit 13 that includes a control section 12 is attached to the rear carrier 17. A motor unit 10 (explained later) and a power storage section 14 are removably installed in the rear carrier unit 13. The power storage section 14 serves as a power source for the control section 12, the front headlamp 13, and other components and comprises, for example, a nickel hydrogen battery or a lithium ion battery. The tail lamp 24 is attached to the power storage section 14 on as to form an integral unit.

The motor unit 10 is attached to a center of the front wheel 6f and serves to assist by driving the front wheel 6f. The motor unit 10 is connected to a front brake device comprising, for example, a roller brake, a band brake or a disk brake. If a front brake device is not connected to the motor unit 10, then it is acceptable to provide a brake device such as a V-brake or a cantilever brake on the front fork 3.

The electrical system 7 comprises a plurality of electrical components of the bicycle. In the first embodiment, the rear carrier unit 13, the motor unit 10, the hanger unit 22a, and the headlamp 23 are electrical components. Each of the electrical components is connected using a two-conductor communication line compatible with a power line communication standard.

Figure 2:
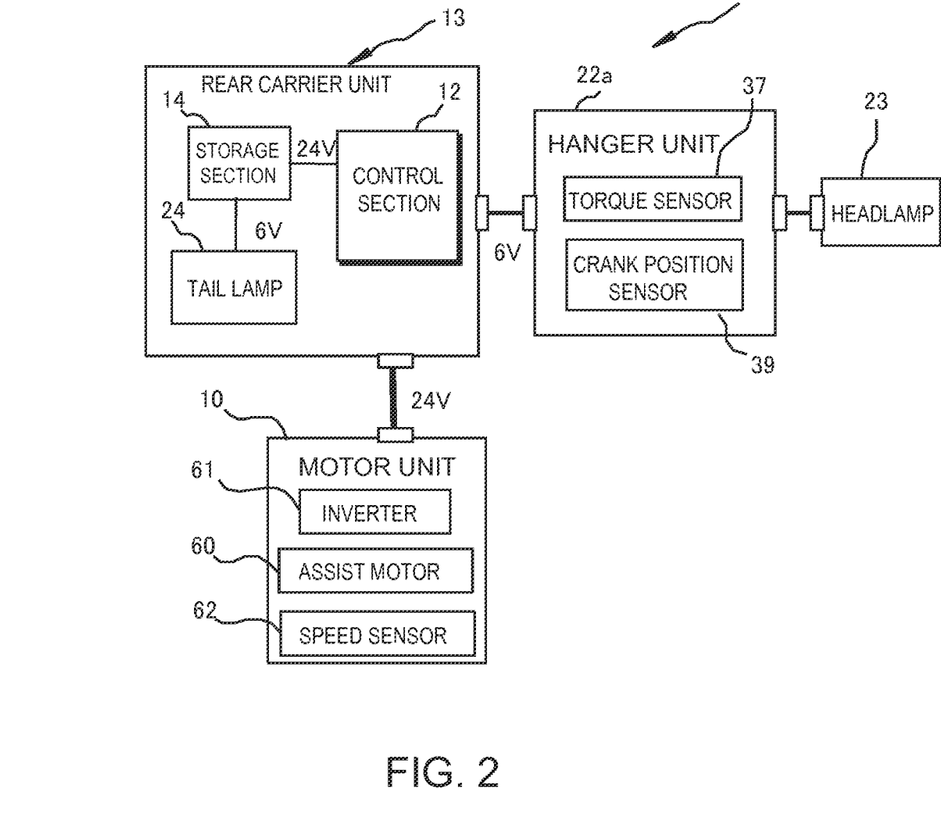
FIG. 2 is a block diagram of the bicycle motor control apparatus in accordance with the first embodiment.

As shown in FIG. 2, an assist motor 60, an inverter 61 and a speed sensor 62 are provided inside the motor unit 10. The assist motor 60 is, for example, a three-phase brushless DC motor or an AC motor. The inverter 61 converts a direct current outputted from the power storage section 14 into an alternating current suitable for driving the assist motor 60. The speed sensor 62 detects a rotational speed of the assist motor 60, i.e., a speed of the bicycle.

Figure 3:
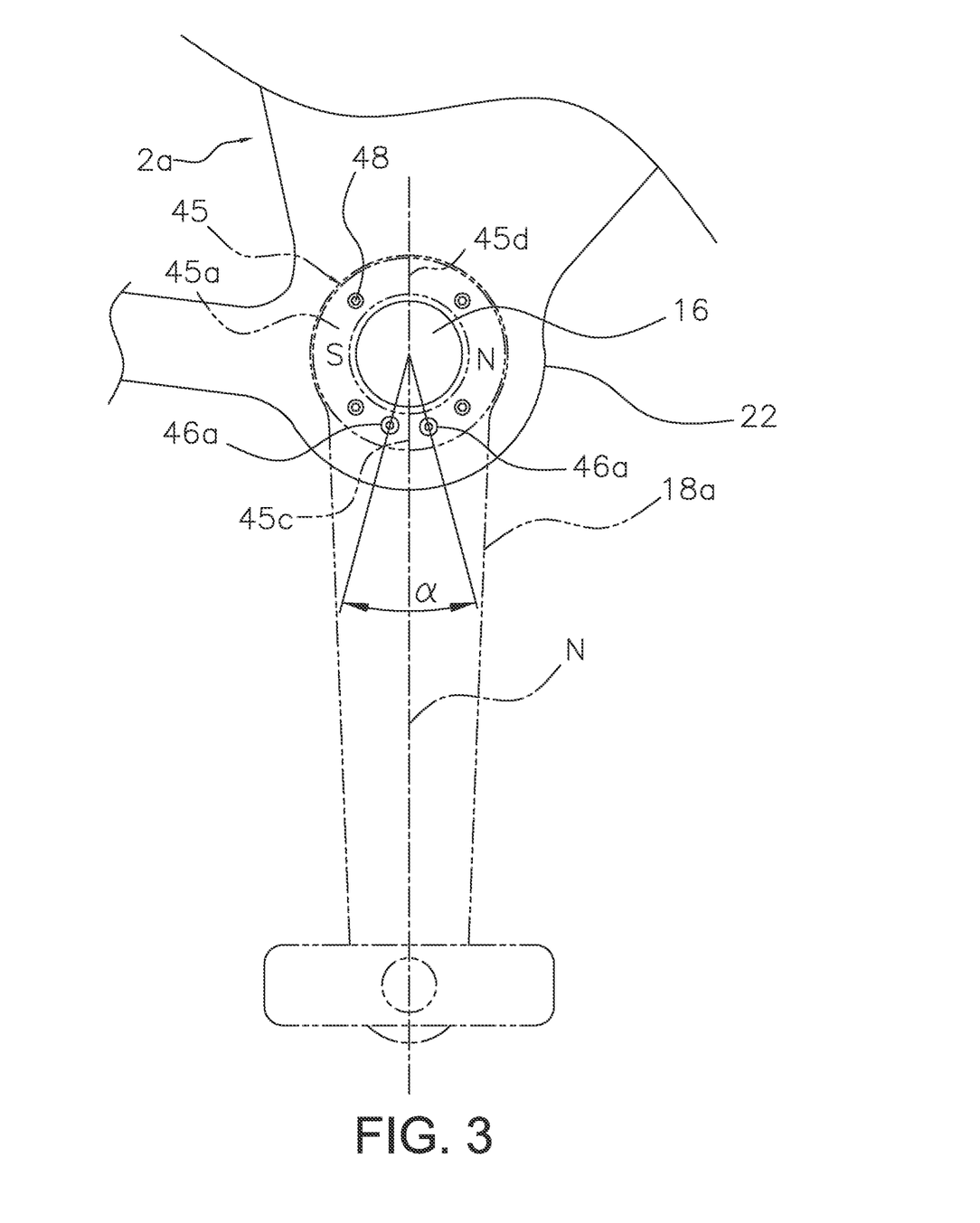
FIG. 3 is an enlarged side elevational view of a bicycle crank and a portion of a bicycle in which a crank position sensor of the motor control apparatus is installed.

The hanger unit 22a is disposed on the right crank 18a and the hanger tube 22. The hanger unit 22a has a torque sensor 37 for detecting a pedaling force acting on the crank axle 16 and a crank position sensor 39 for detecting a rotational position of the crank axle 16. The crank position sensor 39 is one example of a bicycle crank position detecting device that detects a position of a bicycle crank. As shown in FIG. 3, a permanent magnet 45 is provided on the right crank 18a (illustrated in broken lines), while a first Hall Effect element 46a and a second Hall Effect element 46b provided on the hanger tube 22. The permanent magnet 45, the first Hall Effect element 46a and the second Hall Effect element 46b is one example of the bicycle crank position sensor 39 of FIG. 2. The first and second Hall Effect elements 46a and 46b are examples of magnetic force detecting elements.

In the illustrated embodiment of FIG. 3, the permanent magnet 45 is fixed to the right crank 18a and the first and second Hall Effect elements 46a and 46b. However, alternatively, the permanent magnet 45 can be attached to the hanger tube 22 and the first and second Hall Effect elements 46a and 46b can be attached to the right crank 18a. The magnet 45 has an annular shape and has an S-pole part 45a and an N-pole part 45b. The S-pole part 45a and N-pole part 45b are arranged closely adjacent to one another along a circumferential direction. In this embodiment, the magnet 45 has a circular ring-like shape. It is acceptable for the magnet 45 to be a typical permanent magnet or, for example, a magnet made of a resin mixed with a magnetic material. The permanent magnet 45 is fixed to the right crank 18a with a fastening member 48. The fastening member 48 comprises, for example, a plurality of screws 48. The S-pole part 45a and the N-pole part 45b are arranged around an outer circumference of the crank axle 16 and, in the embodiment, each has a semicircular shape. For example, the magnet 45 is divided by a plane containing a center axis of the crank axle 16 and one side constitutes the S-pole part 45a and the other side constitutes the N-pole part 45b. Since the S-pole part 45a and the N-pole part 45b are closely adjacent, there are two borders. The borders are separated by 180 degrees about the crank axle 16.

A first border line 45c and a second border line 45d corresponding to the borders between the S-pole part 45a and the N-pole part 45b are arranged along a lengthwise direction of the right crank 18a. More preferably, the first border line 45c and the second border line 45d are provided on a plane N that contains a rotational axis of the crank axle 16 and an axial centerline of a pedal mounting hole. It is acceptable to provide a positioning structure on one of the magnet 45 and the right crank 18a for positioning them with respect to each other. The positioning structure might be, for example, a protrusion formed on one of the magnet 45 and the right crank 18a and a mating portion configured to mate with the protrusion formed on the other. The mating portion might have, for example, a hole or a groove formed therein. At the first border line 45c, the N-pole part 45b is arranged on an upstream side in a counterclockwise direction and the S-pole part 45a is arranged on a downstream side. At the second border line 45d, the S-pole part 45a is arranged on an upstream side in a counterclockwise direction and the N-pole part 45b is arranged on a downstream side.

The first and second Hall Effect elements 46a and 46b are attached to the right crank 18a in positions facing the magnet 45. The magnet 45 faces the first and second Hall Effect elements 46a and 46b along an axial direction of the bicycle crank. It is acceptable for the first and second Hall Effect elements 46a and 46b to be attached directly to the bottom bracket section 22 or attached to the bottom bracket section 22 with a detachable bracket. The first and second Hall Effect elements 46a and 46b are arranged corresponding to a prescribed region α that includes a bottom dead center position of the right crank 18a or the left crank 18b. In the first embodiment, the prescribed region α spans between two positions of the right crank 18a located, for example, 15 degrees from a reference position in both circumferential directions, the reference position being the bottom dead center position of the right crank 18a. The prescribed region α corresponds to, for example, a 30-degree rotational angle of the right crank 18a. The rotational angle of the right crank 18a corresponding to the prescribed region α is preferably within the range of 20 to 40 degrees.

Figure 4:
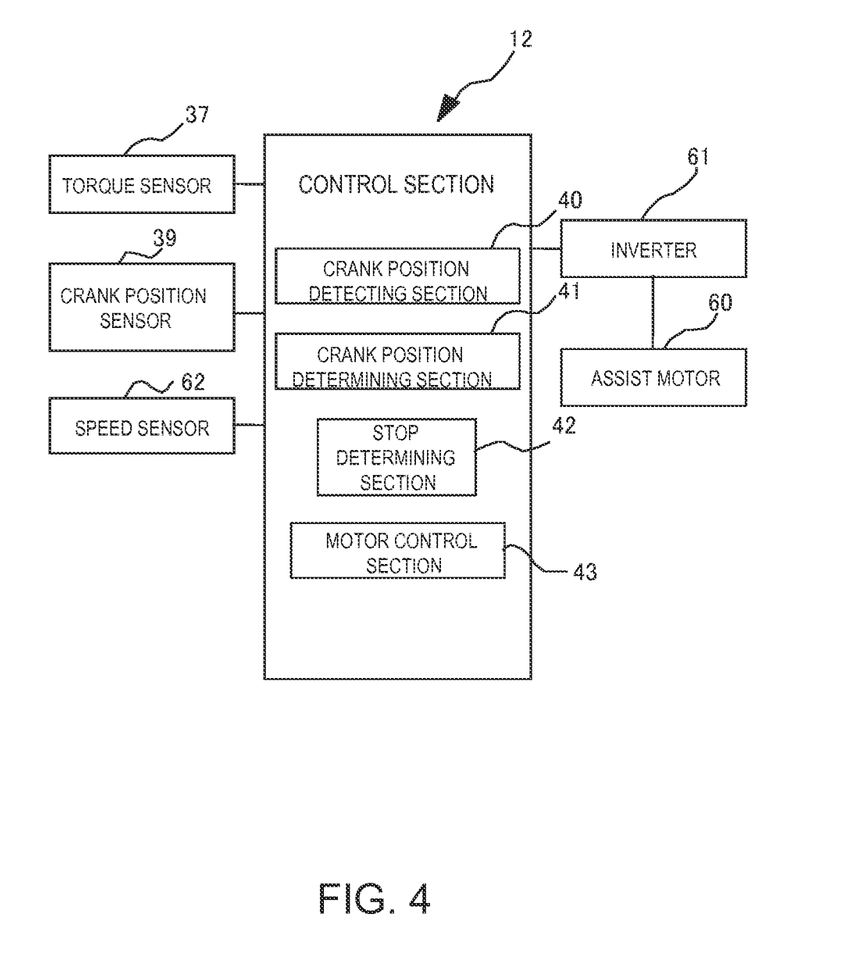
FIG. 4 is a block diagram showing the functional features of a control section (e.g., a controller) of the motor control apparatus.

As shown in FIG. 2, the control section 12 is disposed inside the rear carrier unit 13. The control section 12 includes a microcomputer that serves to control the electric components that are connected to the control section 12. T During an assist mode, the control section 12 can control the motor unit 10 to generate an assisting force corresponding to a pedaling force exerted by a rider. As shown in FIG. 4, the control section 12 is preferably a controller that has the following functional components that are realized by executing the software: a crank position detecting section 40, a crank position determining section 41, a stop determining section 42, and a motor control section 43.

The bicycle crank position detecting section 40 detects crank positions of the right crank 18a and the left crank 18b based on output from the bicycle crank position sensor 39 (i.e., the bicycle crank position detecting device). The bicycle crank position determining section 41 determines if the right crank 18a or the left crank 18b of the bicycle is in the prescribed region α including the bottom dead center position based on a detection result from the bicycle crank position detecting section 40. The bicycle crank position determining section 41 determines which of four regions the right crank 18a and the left crank 18b are in based on the combined outputs of the first and second Hall Effect elements 46a and 46b. in this embodiment, the first and second Hall Effect elements 46a and 46b are both configured to produce a low (L) level output when they are facing the S-pole part 45a and a high (H) level output when they are facing the N-pole part 45b. Combinations of the output signals from the first and second Hall Effect elements 46a and 46b are categorized into a first combination A1, a second combination A2, a third combination A3 and a fourth combination A4.

Figure 5A:
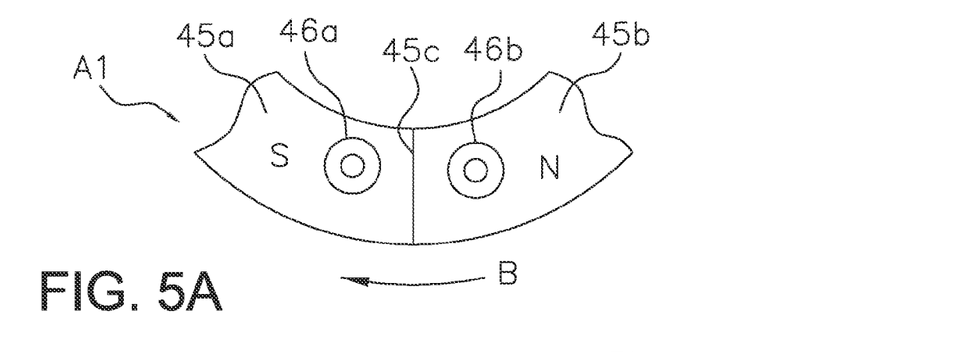
FIGS. 5A to 5D illustrates an operational example of how a crank position determining section executes a determination of the crank position.

FIG. 5A shows an example of positions of the first Hall Effect element 46a, the second Hall Effect element 46b, and the magnet 45 when the output signals form the first combination A1. In the first combination A1, for example, the output of the first Hail Effect element 46a is at the low (L) level and the output of the second Hall Effect element 46b is at the high (H) level. The outputs of the first and second Hail Effect elements 46a and 46b form the first combination A1 when the right crank 18a is in the prescribed region α that includes the bottom dead center position. When the outputs of the first and second Hall Effect elements 46a and 46b form the first combination A1, the first border line 45c of the magnet 45 is positioned between the first and second Hall Effect elements 46a and 46b in a side view of the bicycle as shown in FIG. 5A.

Figure 5B:
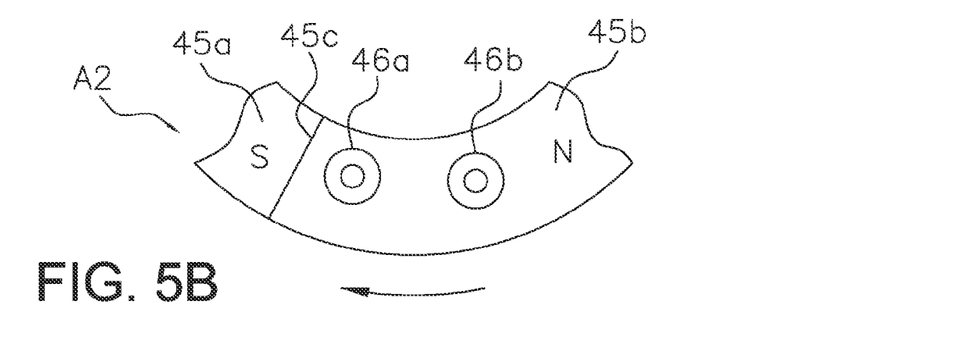

FIG. 5B shows an example of positions of the first Hall Effect element 46a, the second Hall Effect element 46b, and the magnet 45 when the output signals form the second combination A2. In the second combination A2, for example, the outputs of the first and second Hall Effect elements 46a and 46b are both at the level. The outputs of the first and second Hall Effect elements 46a and 46b form the second combination A2 when the right crank 18a has been rotated in the direction of an arrow B (clockwise when viewed from the right side of the bicycle) from the prescribed region α including the bottom dead center position to such an extent that the first border line 45c of the magnet 45 has passed the first Hall Effect element 46a but the left crank 18b has not yet entered the prescribed region α including the bottom dead center position.

Figure 5C:
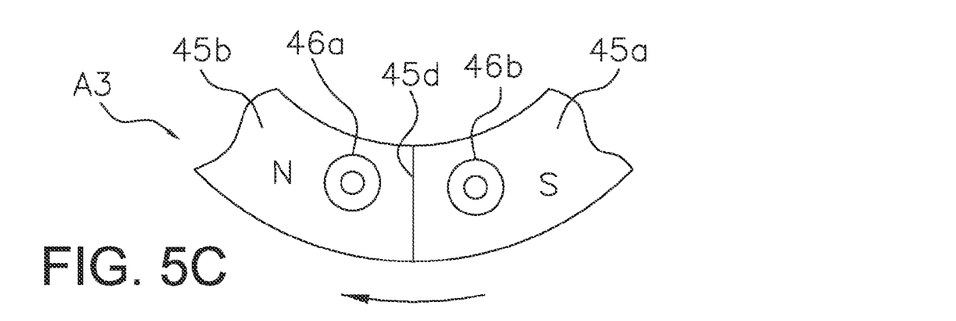

FIG. 5C shows an example of positions of the first Hall Effect element 46a, the second Hall Effect element 46b, and the magnet 45 when the output signals form the third combination A3. In the third combination A3, for example, the output of the first Hall Effect element 46a is at the H level and the output of the second Hall Effect element 46b is at the L level. The outputs of the first and second Hall Effect elements 46a and 46b form the third combination A3 when the left crank 18b is in the prescribed region α that includes the bottom dead center position. When the outputs of the first and second Hall Effect elements 46a and 46b form the third combination A3, the second border line 45d of the magnet 45 is positioned between the first and second Hall Effect elements 46a and 46b in a side view of the bicycle as shown in FIG. 5C.

Figure 5D:
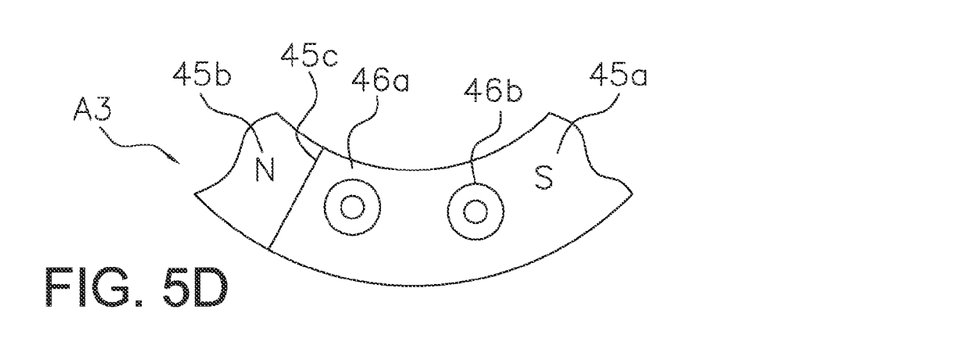

FIG. 5D shows an example of positions of the first Hall Effect element 46a, the second Hall Effect element 46b, and the magnet 45 when the output signals form the fourth combination A4. In the fourth combination A4, for example, the outputs of the first and second Hall Effect elements 46a and 46b are both at the L level. The outputs of the first and second Hall Effect elements 46a and 46b form the fourth combination A4 when the left crank 18a has been rotated in the direction of the arrow B (clockwise when viewed from the right side of the bicycle) from the prescribed region α including the bottom dead center position to such an extent that the second border line 45d of the magnet 45 has passed the first Hall Effect element 46a but the right crank 18a has not yet entered the prescribed region α including the bottom dead center position.

The stop determining section 42 determines if the right crank 18a and the left crank 18b are in a stopped state. The stop determining section 42 determines that the right crank 18a and the left crank 18b are stopped when the outputs of the first and second Hall Effect elements 46a and 46b do not changed for a predetermined amount of time.

After the stop determining section 42 has determined that the right crank 18a and the left crank 18b are in a stopped state, the motor control section 43 prohibits driving the assist motor 60 during a period when the bicycle crank position determining section 41 determines that the right crank 18a or the left crank 18b is in the prescribed region. During a period when driving the assist motor 60 is prohibited, if the right crank 18a or the left crank 18b exit the prescribed region α, i.e., if the bicycle crank position determining section 41 determines that output combination of the first and second Hall Effect elements 46a and 46b has changed from the first combination A1 or the third combination A3 to the second combination A2 or the fourth combination A4, then the motor control section 43 drives the assist motor 60 according to a torque (pedaling force) detected by the torque sensor 37, which is a pedaling force detecting section.

The left and right directions of the bicycle are defined to be the left and right directions as viewed from a position rearward of the bicycle.

The control operations of the control section 12 will now be explained based on the control flowchart shown in FIG. 6.

Figure 6:
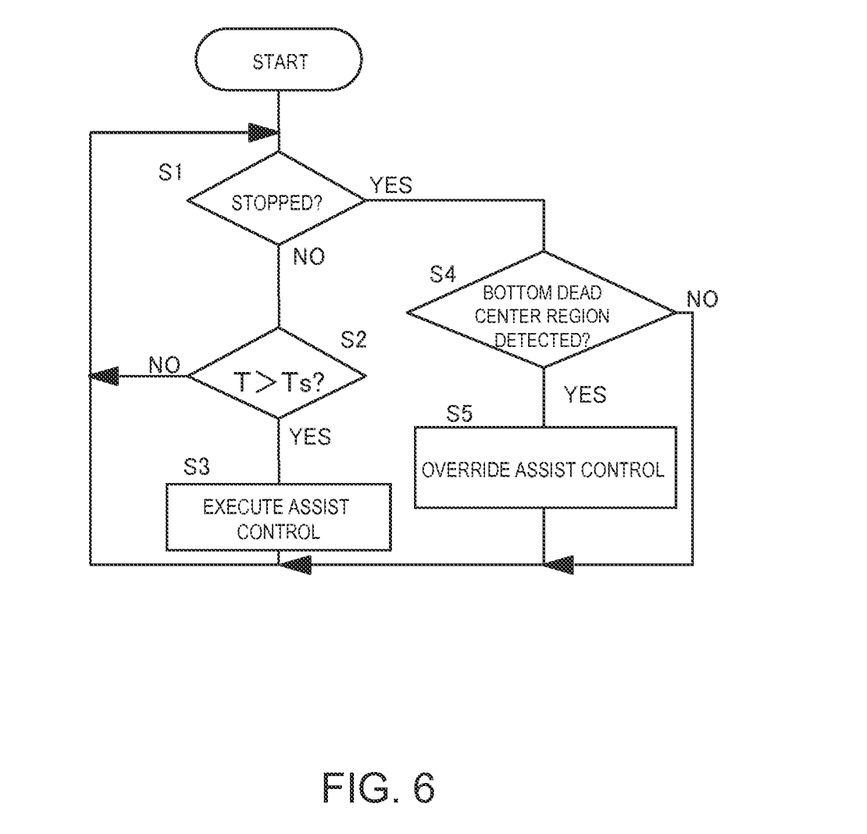
FIG. 6 is a flowchart showing a control executed by an electric power source control section of the motor control apparatus.

In step S1 of FIG. 6, the control section 12 determines if the right crank 18a and the left crank 18b have stopped. If they are not stopped, then the control section 12 proceeds to step S2.

In step S2, the control section 12 determines if a torque T detected by the torque sensor 37 is larger than a prescribed torque Ts. If the detected torque T is larger than the prescribed torque Ts, then the control section 12 proceeds to step S3 and executes an assist control according to the detected torque T. The control section 12 then returns to step S1. If the detected torque T is equal to or smaller than the prescribed torque Ts, then the control section 12 returns to step S1. If it determines that the right crank 18a is stopped, then e control section 12 proceeds from step S1 to step S4.

In step S4, the control section 12 determines if the right crank 18 or the left crank 18b is positioned in the prescribed region α including the bottom dead center position. This determination is made based on the output combination of the first and second Hall Effect elements 46a and 46b of the bicycle crank position sensor 39 as explained previously regarding the bicycle crank position determining section 46. In other words, the determination is accomplished by determining if the combination of the outputs of the first and second Hall Effect elements 46a and 46b corresponds to the first combination A1 indicating that the right crank 18a is in the prescribed region or the third combination A3 indicating that the left crank 18b is in the prescribed region. If the control section 12 determines that the right crank 18a or the left crank 18b is positioned in the prescribed region α, then the control section 12 proceeds from step S4 to step S5. In step S5, the control section 12 prohibits driving the assist motor 60, i.e., overrides the assist control, and returns to step S1. If the control section 12 determines that the right crank 18a or the left crank 18b is not positioned in the prescribed region α, then the control section 12 returns to S1.

When the control section 12 determines that the rotational position of the right crank 18a or the left crank 18b is in the prescribed region α including the top dead position, the control section 12 prohibits driving the assist motor 60. Thus, while the right crank 18a or the left crank 18b is positioned within the prescribed region α, the assist motor 60 will not be driven even if a rider uses a particular mounting technique in which the rider places one foot on a pedal and kicks the ground with the other foot. As a result, occurrences of undesired increases of a supplemental force can be suppressed when the bicycle is being started into motion. Also, when a rider sits on the saddle 11 and turns the right and left cranks 18a and 18b, a control can be executed to deliver an appropriate assisting force as soon as the right crank 18a or the left crank 18b exits the prescribed region α.

Figure 7:
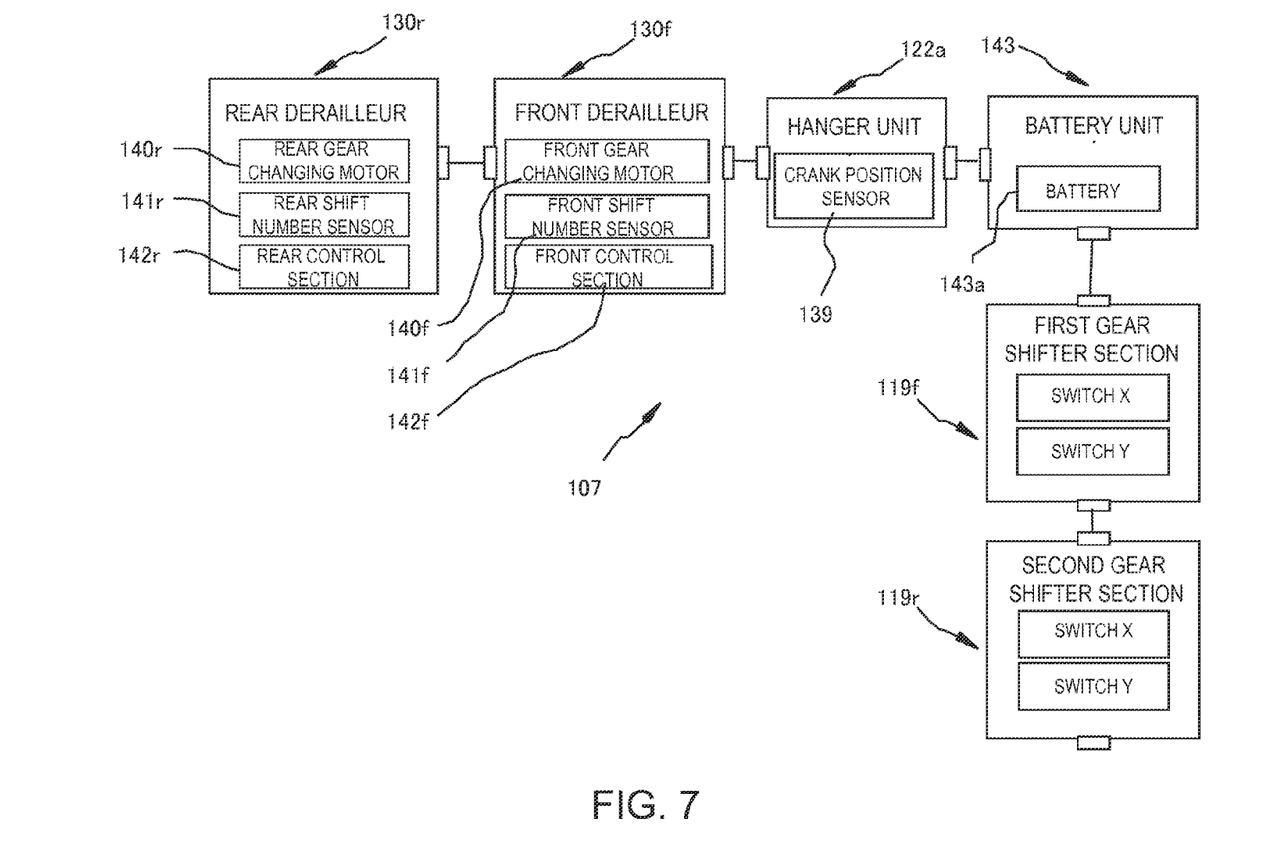
FIG. 7 is a block diagram, similar to FIG. 2, of a bicycle motor control apparatus in accordance with a second embodiment.

While the first embodiment exemplifies the bicycle motor control apparatus employed in an assisted bicycle in which the assist motor 60 supplements a drive provided by the rider, the second embodiment is an example in which the bicycle has an electric powered external transmission. FIG. 7 shows a bicycle electrical system 107 that includes, for example, six electric components. The electric components are a rear derailleur 130r, a front derailleur 130f, a hanger unit 122a, a battery unit 143, a first gear shifter section 119f, and a second gear shifter section 119r. The front derailleur 130f has a front gear changing motor 140f, a front shift position sensor 141f, and a front control section 142f. The front control section 142f is an example of a motor control section. The rear derailleur 130r has a rear gear changing motor 140r, a rear shift position sensor 141r, and a rear control section 142r. The rear control section 142r is an example of a motor control section. The front gear changing motor 140f is controlled by the front control section 142f. The rear gear changing motor 140r is controlled by the rear control section 142r.

The hanger unit 122a has a crank position sensor 139 having the same structure as in the first embodiment. The battery unit 143 has a rechargeable battery 143a that is removably installed. The first gear shifter section 119f has a switch X and a switch Y for executing shift operations of the front derailleur 130f. The second gear shifter section 119r has a switch X and a switch Y for executing shift operations of the rear derailleur 130r.

The front control section 142f drives the front gear changing motor 140f according to operations of the switch X and the switch V provided on the first gear shifter section 119f and thereby executes shift operations of the front derailleur 130f. The rear control section 142r drives the rear gear changing motor 140r according to operations of the switch X and the switch Y provided on the second gear shifter section 119r and thereby executes shift operations of the rear derailleur 130r.

Similarly to the first embodiment, the front control section 142f prohibits driving the front gear changing motor 140f in accordance with an output of the bicycle crank position sensor 139. Also similarly to the first embodiment, the rear control section 142r prohibits driving the rear gear changing motor 140r in accordance with an output of the bicycle crank position sensor 139. More specifically, if either one of the right crank and the left crank is determined to be in a prescribed region including a bottom dead center position, then driving of the front gear changing motor 140f and the rear gear changing motor 140r in response to operations of the switches X and the switches Y will be prohibited.

With the second embodiment, inappropriate gear change operations will not occur even if the right crank or the left crank is turned or rocked while inside the prescribed region α. As a result, the front gear changing motor 140f and the rear gear changing motor 140r of the external transmissions can be controlled appropriately in accordance with a riding technique used when starting the bicycle into motion.

Although embodiments of the present invention have been presented heretofore, the present invention is not limited to these embodiments and various modifications can be made without departing from the scope of the invention as defined by the claims.

Although in the previously explained embodiment the bicycle crank position sensor has a magnet and magnetic force detecting elements, the bicycle motor control apparatus is not limited to using such a crank position sensor. It is acceptable for the bicycle crank position sensor to be, for example, a sensor that can detect a rotational position of a rotary encoder. Alternatively, the bicycle crank position sensor can be either a through-beam type photoelectric sensor or a diffuse reflective type optical sensor with a light blocking member that blocks a light path of the optical sensor in accordance with rotation of the bicycle crank.

Although in the previously explained embodiment a Hall Effect element is presented as an example of a magnetic force detecting element, the bicycle motor control apparatus is not limited to using the Hall Effect element. For example, it is acceptable for the magnetic force detecting element to be a lead switch, a coil, or something else that can detect a magnetic force.

In the previously explained embodiment, the motor control section determines if the bicycle crank is stopped based on outputs from the magnetic force detecting elements of the bicycle crank position sensor and, after determining that the bicycle crank is stopped, prohibits driving the motor while the bicycle crank is in a prescribed region. However, the present invention is not limited to such a configuration. For example, it is acceptable for the control section to determine if the bicycle is stopped instead of determining if the bicycle crank is stopped and then, after determining that the bicycle is stopped, to prohibit driving the motor while the bicycle crank is in the prescribed region. In such a case, the stop determining section determines if the bicycle—not the bicycle crank— is in a stopped state based on an output from the speed sensor 62 shown in, for example, FIG. 2. Using the speed sensor 62 enables the timing of when the bicycle starts into motion to be detected. It is also acceptable to configure the apparatus such that the bicycle crank position determining section determines if the bicycle crank is in the prescribed region after it has been detected that the bicycle has started moving based on a signal from the speed sensor 62. It is also acceptable for the stop determining section to determine if the both the bicycle crank and the bicycle are in a stopped state.

Although in the previously explained embodiment two magnetic force detecting elements (the first and second Hall Effect elements 46*a* and 46*b*) are provided on the right crank 18*a* and the magnet 45 is provided on the hanger tube 22 of the frame, it is also acceptable to use an opposite configuration. That is, it is acceptable to provide a magnet on the frame and the magnetic force detecting elements on one of the bicycle cranks. It is also acceptable to use the left crank 18*b* as the bicycle crank with either the magnetic force detecting elements or the magnet.

In the embodiment, the first and second Hall Effect elements 46*a* and 46*b* each produce an L level output when they are facing the S-pole part 45*a* and an H level output when they are facing the N-pole part 45*b*. It is also acceptable to reverse the output levels. That is, it is acceptable if the first and second Hall Effect elements 46*a* and 46*b* each produce an H level output when they are facing the S-pole part 45*a* and an L level output when they are facing the N-pole part 45*b*.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). In understanding the scope of the present invention, terms of degree such as "substantially", "about" and "approximately" as used herein mean a reasonable amount of deviation of the modified term such that the end result is not significantly changed. Thus, the foregoing descriptions of the embodiments according to the present invention are provided for illustration only, and not for the purpose of limiting the invention as defined by the appended claims and their equivalents.

What is claimed is:

1. A bicycle motor control apparatus comprising:
    a bicycle crank position detecting device that detects a position of a bicycle crank; and
    a controller including
        a bicycle crank position determining section that determines if the bicycle crank is in a prescribed region that immediately surrounds a bottom dead center position based on a detection result from the bicycle crank position detecting device;
        a stop determining section that determines a stopped state based on a bicycle operation condition indicative of at least one of a bicycle crank stopped state and a bicycle stopped state; and
        a motor control section that selectively outputs a motor driving command and that stops the output of the motor driving command during a period in which the bicycle crank position determining section determines that the bicycle crank is in the prescribed region and the stop determining section determines that the stopped state exists.

2. The bicycle motor control apparatus as recited in claim 1, wherein
    the bicycle crank position detecting device includes a magnet configured to be attached to one of the bicycle crank and a bicycle frame, the magnet including an S-pole part and an N-pole part that are spaced apart from each another along a circumferential direction about an axis of rotation of the bicycle crank while in an installed position; and
    the bicycle crank position detecting device further includes a pair of magnetic force detecting elements arranged on the other of the bicycle crank and the bicycle frame, the magnetic force detecting elements facing the magnet in positions corresponding to the prescribed region while in an installed position.

3. The bicycle motor control apparatus as recited in claim 2, wherein
    the bicycle crank position determining section determines that the bicycle crank is in the prescribed region using outputs from the magnetic force detecting elements.

4. The bicycle motor control apparatus as recited in claim 3, wherein
    the stop determining section determines that the bicycle crank is in a stopped state based on the outputs from the magnetic force detecting elements not changing for a prescribed amount of time.

5. The bicycle motor control apparatus as recited in claim 4, further comprising
    a pedaling force detecting device that detects a pedaling force acting on the crank;
    the motor control section further being configured such that upon the crank position determining section determining that the crank has departed from the prescribed region during a period when driving the motor is prohibited, then the motor control section drives the motor according to the pedaling force.

6. The bicycle motor control apparatus as recited in claim 2, wherein
    the stop determining section determines that the bicycle crank is in a stopped state based on the outputs from the magnetic force detecting elements not changing for a prescribed amount of time.

7. The bicycle motor control apparatus as recited in claim 2, further comprising
    a pedaling force detecting device that detects a pedaling force acting on the crank;
    the motor control section further being configured such that upon the crank position determining section determining that the crank has departed from the prescribed region during a period when driving the motor is prohibited, then the motor control section drives the motor according to the pedaling force.

8. The bicycle motor control apparatus as recited in claim 7, wherein
  the bicycle crank position determining section determines that the bicycle crank is in the prescribed region using outputs from the magnetic force detecting elements.

9. The bicycle motor control apparatus as recited in claim 7, wherein
  the stop determining section determines that the bicycle crank is in a stopped state based on the outputs from the magnetic force detecting elements not changing for a prescribed amount of time.

10. The bicycle motor control apparatus as recited in claim 7, further comprising
  a speed detecting device that detects a bicycle speed, the stop determining section is operatively connected to the speed detecting device and determines the bicycle stopped state based on a signal from the speed detecting device.

11. The bicycle motor control apparatus as recited in claim 1, further comprising
  a speed detecting device that detects a bicycle speed, the stop determining section is operatively connected to the speed detecting device and determines the bicycle stopped state based on a signal from the speed detecting device.

12. The bicycle motor control apparatus as recited in claim 1, further comprising
  a pedaling force detecting device that detects a pedaling force acting on the crank;
  the motor control section further being configured such that upon the crank position determining section determining that the crank has departed from the prescribed region during a period when driving the motor is prohibited, then the motor control section drives the motor according to the pedaling force.

13. A bicycle including the bicycle motor control apparatus as recited in claim 1, and the bicycle further comprising
  a motor controlled by the bicycle motor control apparatus.

14. The bicycle as recited in claim 13, further comprising
  an external transmission, and the motor is operatively coupled to the external transmission for driving the external transmission.

* * * * *